ent Office 3,297,742
Patented Jan. 10, 1967

3,297,742
METHOD FOR REACTING HYDROGEN CYANIDE WITH OLEFINS
George Clarke Monroe, Jr., Orange, and George Nelson Hammer, Beaumont, Tex., assignors to E. I. du Pont de Nemours and Company, Wilmington, Del., a corporation of Delaware
No Drawing. Filed Oct. 23, 1963, Ser. No. 318,177
8 Claims. (Cl. 260—465.3)

This invention relates to a method for reacting hydrocyanic acid with olefins to yield aliphatic nitriles, and to a catalyst for the same.

It has been known that hydrogen cyanide could be added to carbon-carbon triple bonds to yield alpha-beta unsaturated nitriles, and to compounds with activated double bonds such as the carbonyl group, and carbon-carbon double bonds adjacent to carbonyl groups, nitrile groups or like polar groupings. It has also been known to add hydrocyanic acid to conjugated unsaturated systems. Organic compounds containing isolated i.e., non-conjugated, unactivated double bonds such as ethylene or its homologues, react with hydrocyanic acid only with considerable difficulty. Thus, Teter, U.S. Patent 2,385,741, teaches reacting olefins with anhydrous hydrogen cyanide (hydrocyanic acid gas) in the presence of metallic cobalt or copper catalysts at temperatures of 450° to 750° C. or higher. The greatest yield of nitrile, recorded in the examples of this patent was 3.49% based on the olefin using a temperature of 750° C. and in the presence of an excess of hydrocyanic acid.

It has now been discovered that hydrogen cyanide may be added to the lower aliphatic olefins by passing a mixture of the olefin and hydrogen cyanide over a bed of a catalyst comprising nickel cyanide at a temperature in the range between about 300° C. and 400° C., and thereafter recovering an organic nitrile formed by the addition of hydrogen cyanide to the olefin.

The lower aliphatic olefins to which the reaction of this invention is applicable are ethylene, propylene and butene-1 and butadiene i.e. The lower aliphatic 1-olefins having from 2 to 4 carbon atoms.

In a preferred embodiment of the invention propionitrile is manufactured by the continuous vapor phase addition of hydrogen cyanide to ethylene.

Preferably the nickel cyanide catalyst is supported on a porous pellet of a catalyst support such as gamma alumina. It has been shown, however, that nickel cyanide alone is an effective catalyst for the reaction and that gamma alumina has no substantial effect on the reaction. The nickel cyanide may be formed by wet chemical methods or may be formed by the action of hydrogen cyanide gas on nickel oxide. Nickel oxide on alumina is available as a commercial catalyst and provides a suitable starting material for the catalysts employed in this invention.

The conversion of the supported nickel oxide to the nickel cyanide catalyst may be achieved by passing HCN over the nickel oxide on alumina at temperatures in the range between about 300° C. and about 400° C. i.e., substantially the same range as the catalytic addition of hydrogen cyanide to the olefins occurs. Indeed, the cyaniding may be accomplished by passing the reaction mixture over the heated nickel oxide in which case little aliphatic nitrile is produced until appreciable conversion to nickel cyanide has been achieved. Preferably, however, the supported nickel oxide is converted to nickel cyanide by passing hydrogen cyanide, either alone or mixed with nitrogen, over the nickel oxides at temperatures greater than 400° C. Nickel cyanide catalysts so prepared at 300° C. are green in color and exhibit moderate activity.

Catalyst prepared at about 350° C. are gray in color but exhibit substantially the same catalytic activity as the green catalyst prepared by cyaniding at lower temperatures. Catalysts prepared at a temperature greater than 400° C. are black in color and exhibit a substantially greater activity than catalysts prepared at the lower temperature, and further the activity of the catalyst is maintained for a longer time when prepared at temperatures greater than 400° C. than when prepared at lower temperatures. Accordingly, it is preferred to cyanide the catalyst at a temperature in the range between 400° C. and 600° C. or alternatively to heat catalysts cyanided at temperatures below 400° C. to a temperature in the range between 400° C. and 600° C. to effect conversion to the active, black modification of nickel cyanide.

The catalysts described hereinabove exhibit a high initial activity which decreases rapidly but levels off after about two to four hours and thereafter decreases quite slowly. The catalysts may be reactivated by heating in air or oxygen, at temperatures of 500 to 800° C. and thereafter cyaniding as in the preparation of fresh catalyst. Heating the catalyst to about 700° C. in a mixture of water vapor and air has been found to be particularly effective as the first step in regenerating the catalyst.

The temperature at which the reaction may be carried out may be as low as 250° C. for continuous operation, which is of particular importance for industrial production. For batch-wise production wherein greatly increased contact time with the catalyst occurs, lower temperatures may be employed, however, catalyst life decreases with decreasing temperature and it is preferred to operate in the range between 300° C. and 400° C. Over the preferred range of temperature, the yield of the desired nitriles is little affected. Above 400° C. however, significant amounts of by-products, which may result from decomposition of the nitriles, are found.

The reaction may be conveniently carried out at atmospheric pressure, or at lower pressures or partial pressures. Higher pressures may also be employed i.e., up to 1000 p.s.i. or even greater pressures. The yield of the desired nitrile is substantially independent of pressure, but the productivity per pound of catalyst increases substantially in proportion to the pressure and accordingly higher pressures are preferred for economic operation.

Other gases may be present in the feed including minor amounts of nitrogen, methane, ethane, and higher alkanes, carbon monoxide, carbon dioxide, ammonia and hydrogen sulphide without substantial effect on the catalytic addition of the hydrogen cyanide to the olefin.

The proportion of hydrogen cyanide to the olefin is not critical, and the reaction proceeds with high yield with feeds containing an excess of olefin or an excess of hydrogen cyanide.

This invention is further illustrated by the following examples which are, however, not intended to fully delineate the scope of this discovery.

*Examples 1–8*

In the following examples the addition of hydrogen cyanide to ethylene was carried out in a flow system. Ethylene was metered by rotameters into a hydrogen cyanide bubbler where it was saturated with hydrogen cyanide at pre-set temperatures, thus providing control of partial pressure of hydrogen cyanide in the feed. The bubbler was weighed before and after the runs in order to determine the total weight of hydrogen cyanide employed. The gas mixture was then passed over the catalyst in the form of granules contained in a 1″ diameter hard glass tube fitted with a ¼″ O.D. thermowell. In each case the catalyst was prepared by cyaniding a commercial nickel oxide on gamma alumina catalyst. The catalyst tube was heated by a split tube electrical furnace which was thermostatically controlled to ±1° C. The exit gases were conducted to the analytical apparatus by exit lines heated to 100–120° C. in order to prevent condensation of the products. A by-pass was provided for sampling the entrance gas with the same analytical equipment as that employed in the analysis of the products. Propionitrile was determined by gas chromatography. The gases were absorbed in a scrubber containing a 1:1 toluene-acetic acid mixture. Hydrogen cyanide was determined in the scrub solution by titration with silver nitrate in the presence of ammoniacal potassium iodide. Ammonia was determined by titration with 0.05 N perchloric acid in methanol. The titration procedure was checked against standard solutions containing known concentrations of hydrogen cyanide and ammonia respectively.

The results of these experiments are set forth in Table I.

wide variety of uses as solvents and the like. They are important intermediates for the preparation of a broad spectrum of organic chemicals as described for example in the text, "The Chemistry of Organic Cyanogen Compounds," by V. Migridichian, American Chemical Society Monograph No. 105, Reinhold Publishing Co., 1947.

Many other modifications of this invention will be apparent to those skilled in the art.

We claim:
1. A process for the manufacture of aliphatic nitriles which comprises passing a mixture of hydrogen cyanide and a lower aliphatic olefin over a catalyst consisting essentially of nickel cyanide at a temperature in the range between about 250° C. and 400° C. and thereafter recovering an aliphatic nitrile formed by the addition of hydrogen cyanide to the double bond of the said olefin from the reaction product.

TABLE 1.—ADDITION OF HYDROGEN CYANIDE TO ETHYLENE IN THE PRESENCE OF A CATALYST OF NICKEL CYANIDE ON ALUMINA

| Ex. No. | Catalyst | Temp. °C. | Contract Time, Sec. | Feed Mole, percent | | Exit Gas Analysis Moles × $10^2$ | | | | Percent Conversion | | Percent Yield | |
|---|---|---|---|---|---|---|---|---|---|---|---|---|---|
| | | | | HCN | Ethylene | Propionitrile | HCN | Ethylene | Other | HCN | $C_2H_4$ | On HCN | On $C_2H_4$ |
| 1 | 10% NiCN or $Al_2O_3$ (Cyanided at 360°). | 350–375 | 2 | 29 | 71 | 6.13 | 9.98 | | 0.23 | 37 | | 79 | |
| 2 | ----do---- | 350 | 2 | 28 | 72 | 1.86 | 4.40 | 12.39 | Trace | ~30 | 17 | ~86 | 75 |
| 3 | ----do---- | 350 | 2 | 28 | 72 | 1.64 | 4.67 | 12.60 | Trace | ~21 | 17 | 87 | 65 |
| 4 | 10% NiCN or $Al_2O_3$ (treated at 420° C.). | 325 | 2.5 | 33 | 67 | 17.82 | 35.82 | 98.55 | 2.24 | 40 | 17.5 | 75 | 86 |
| 5 | 10% NiCN or $Al_2O_3$ cyanided at 320° C. | 327 | 2.5 | 33.7 | 66.3 | 12.59 | 30.01 | 74.40 | 1.30 | 34 | 16.9 | 80.7 | 83 |
| 6 | 10% NiCN or $Al_2O_3$ cyanided at 300° C. | 380 | 2.3 | 33.6 | 66.4 | 37.82 | 4.69 | 75.03 | 6.80 | 92 | 37 | 68 | 87 |
| 7 | ----do---- | 345 | 2.4 | 20.3 | 79.7 | 21.28 | 0.21 | 92.7 | 5.22 | 100 | 4.7 | 68 | 70 |
| 8 | ----do---- | 265 | 2.0 | 34.6 | 65.4 | 4.10 | 23.40 | 60.30 | 0.66 | 30 | 4.0 | 42 | 100 |

*Example 9*

A catalyst was prepared by soaking granules of charcoal in nickel chloride then precipitating nickel cyanide by a solution containing the stoichiometric proportion of potassium cyanide, washing with water and drying. Some nickel cyanide was lost from the catalyst in the washing process.

The catalyst was placed in the apparatus employed in Examples 1–8, heated to 350° C. and a mixture of 33 mole percent hydrogen cyanide and 67 moles percent ethylene was passed over the catalyst with a contact time of 2.5 seconds. 254 moles of propionitrile were recovered from the product, the percent conversion being 26% based on hydrogen cyanide.

*Example 10*

The process of Example 9 was repeated except that the catalyst consisted of ¼″ pellets of compressed anhydrous nickel cyanide without a support. At 340° C., with a contact time of 2.5 seconds, a 12–15% conversion based on HCN to propionitrile was obtained.

Nitriles are well known organic chemicals having a

2. Process of claim 1 in which the said olefin is ethylene.
3. Process of claim 1 in which the catalyst consists of nickel cyanide supported on porous pellets of gamma alumina.
4. Process of claim 3 in which said catalyst is prepared by passing hydrogen cyanide over nickel oxide supported on alumina and heating to a temperature in the range between 400° C. and 600° C.
5. Process of claim 3 in which the said olefin is ethylene.
6. Process of claim 4 in which the said olefin is ethylene.
7. Process of claim 1 in which the said catalyst is nickel cyanide supported on charcoal.
8. Process of claim 7 in which the said olefin is ethylene.

No references cited.

CHARLES B. PARKER, *Primary Examiner.*

JOSEPH P. BRUST, *Examiner.*